United States Patent Office 3,363,728
Patented Jan. 16, 1968

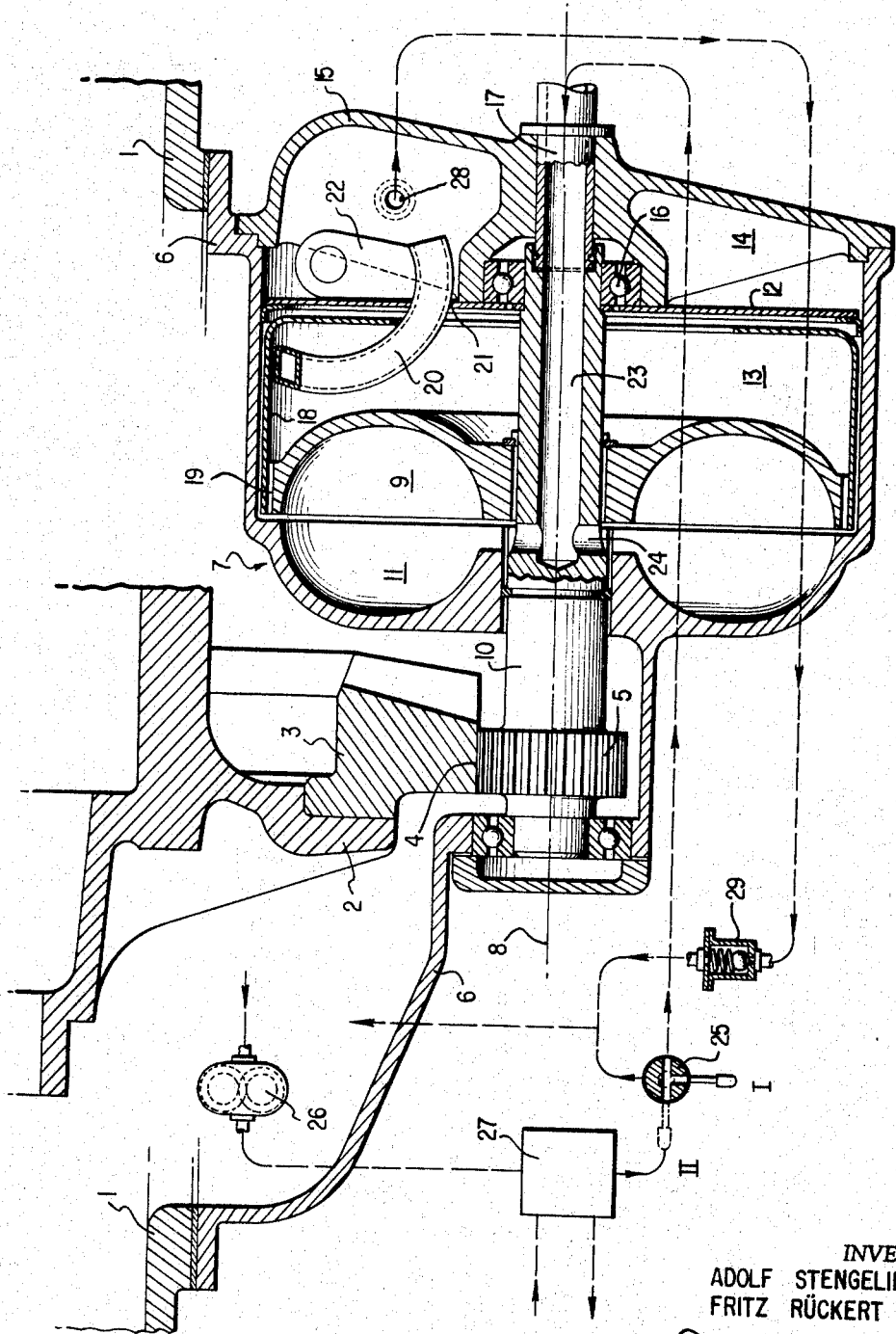

3,363,728
HYDRODYNAMIC VEHICLE BRAKE
Adolf Stengelin, Stuttgart-Rotenberg, and Fritz Rückert, Waiblingen, Germany, assignors to Daimler-Benz Aktiengesellschaft, Stuttgart-Unterturkheim, Germany
Filed Mar. 23, 1965, Ser. No. 441,969
Claims priority, application Germany, Apr. 2, 1964, D 44,055
9 Claims. (Cl. 188—90)

The present invention relates to a continuously actuable brake for motor vehicles, especially for heavy trucks by means of a hydrodynamic circulatory system.

Above all with heavy trucks the problem of a brake adapted to be energized for longer periods has been acute for quite some time because over and over again it has proved itself that the wheel brakes are only inadequately suited for continuous loads. Fading effects and excessive wear occur thereby. A continuously energizable brake should be capable of producing a braking moment, as great and as easily adjustable as possible. Furthermore, such continuously energizable brake should operate without wear whence friction brakes are eliminated for this purpose.

One has attempted to solve this problem with so-called engine brakes. The braking effect of the engine brake, however, is inadequate in the upper speeds. Only the larger transmission ratios of the braking moment in the lower speeds enables a sufficient braking effect, however, with insufficient speed. Within this range the transporting driving output is too inadequate, and the vehicle impairs the road traffic. On the other hand, it is also known to utilize with automatic transmissions hydrodynamic circuits for purposes of braking. Also in such prior art arrangements the entire driving connection is loaded by the braking moment and additionally only the braking moment of the engine is rendered effective.

The present invention aims at the elimination of the aforementioned disadvantages. The present invention solves this aim with arrangements of the type described above in that a speed-up gearing is arranged at the bevel gear of a differential gear preferably coordinated to an axle, which speed-up gear drives the pump wheel of a conventional hydrodynamic coupling whose turbine wheel is non-rotatably secured. In a preferred embodiment, the filling of the hydrodynamic coupling serving as brake may be constructed adjustable, for example, by scooping tubes or the like and the turbine wheel of the coupling may be secured at all times at a fixed housing part or may be constituted by such a housing part.

The construction in accordance with the present invention possesses the advantage that a large drive gear is available in the presence of the bevel gear without additional expenditures. The large transmission ratio obtainable thereby enables a light and small hydraulic brake unit to perform effectively. The brake moment loads neither the joint shaft nor the rear axle drive which may be important, in particular, with hypoid drive. The corresponding parts may therefore be constructed of smaller weight and the wear at these parts is not influenced by the braking.

In principle, one may utilize for the present invention a hydrodynamic coupling with constant filling and whose turbine wheel is selectively or detachably secured at the housing. Furthermore, for the transmission of the torque between turbine wheel and brake any suitable shaped gear drive may be used.

With a preferred construction in accordance with the present invention, the hydrodynamic coupling is arranged with its axis parallel to the differential axis within a housing separate from the differential which coupling housing forms simultaneously a cover of the differential housing. End teeth are thereby arranged externally at the bevel gear or are directly cut into the same which engage with a pinion mounted on the shaft of the hydrodynamic coupling. This results in a brake of very small dimensions that additionally may be pre-assembled in the cover and may be installed subsequently into a vehicle. Consequently, the rear axle drive as such remains unchanged whereby manufacture and bearing supports are also simplified. The teeth at the bevel gear and pinion may be constructed according to the present invention with such an inclination that the axial thrust resulting therefrom compensates for the axial thrust produced by the hydrodynamic coupling.

Furthermore, the construction of the coupling itself may, in principle, be realized in any known suitable manner. However, the present invention prefers a construction whereby the coupling housing is subdivided by a fixed partition wall into an inner space accommodating the pump wheel and the turbine wheel, constituted by the housing itself, and into an outer or external space closed by a cover. There is thereby secured appropriately at the pump wheel a rotating collecting dish matched to the circumference of the housing and its fixed partition wall, whose radial part adjacent the partition wall has such a large inner diameter and such a spacing from the pump wheel rear wall that a scoop tube may be introduced into the collecting dish from the outer space. However, it is also within the scope of the present invention to work only with the collecting dish and to omit the fixed partition wall.

The construction and arrangemnt of the scoop tube or tubes may be realized in any known conventional manner. However, it is proposed according to the present invention to introduce an approximately circular segmentally shaped bent scoop tube through an aperture provided in the partition wall into the collecting dish and to pivot the same by means of a pivot lever disposed in the outer space about an axis transverse to the coupling axis. In order to achieve a greater brake moment, the pump wheel of the coupling may be provided in a conventional manner with forwardly inclined or curved blades. The blades at the turbine wheel may be curved backwardly correspondingly.

The present invention is also concerned with the construction of the circulatory system for the coupling liquid by means of which the heat produced during braking is conducted away. Of course, this circuit may be separate from other already present circulatory systems of the vehicle. However, the present invention starts with the general concept to give off the heat produced at the brake to the engine cooling water. This is of advantage because during braking the engine is substantially unloaded and accordingly gives off very little heat. Hence, this arrangement may contribute in an advantageous manner toward the constancy of the cooling water temperature.

In particular, the present invention proposes that a pump, a heat exchanger, and a closure member are arranged in the circulatory system of the coupling liquid whereby the oil filling of the differential may serve as coupling liquid. The latter has the advantage that with a pulling drive the rear axle oil can be cooled. The cooling circulatory system of the engine passes, according to the present invention, through the heat exchanger, which is arranged between the pump and the closure member, whereby the closure member is constructed as a three-way valve which selectively conduits the liquid flow derived from the pump either to the return line or to the brake. A check valve may be arranged in the return duct from the brake.

Accordingly, it is an object of the present invention to provide a vehicle brake, especially for trucks which is capable of continuous energization without the drawbacks and shortcomings encountered with the prior art constructions.

Another object of the present invention resides in the provision of a continuously energizable vehicle brake which is capable of continuous brake energization without fading effects or excessive wear.

Another object of the present invention resides in a continuously actuatable brake system for vehicles, especially trucks, which is capable of producing a relatively high and easily adjustable brake moment under all operating conditions and at all driving speeds.

A further object of the present invention resides in the provision of a braking system for trucks capable of energization during long periods of time which assures a sufficient braking effect at all times, does not subject the entire drive connection to the braking effect and utilizes, for the most part, structural elements already present with most vehicles.

Another object of the present invention resides in the provision of a hydraulic vehicle brake utilizing a hydrodynamic coupling which permits a brake of relatively small dimensions and weight and of significantly reduced wear.

A still further object of the present invention resides in the provision of a motor vehicle brake which not only is easy to assemble and install but may be manufactured in a relatively inexpensive manner without involving costly changes in existing designs.

Still a further object of the present invention resides in a vehicle brake utilizing a hydrodynamic coupling as braking element which is so connected with the engine circulatory system as to contribute in a significant manner to the constancy of the temperature of the cooling water.

These and other objects, features, and advantages of the present invention will become more obvious from the following description when taken in connection with the accompanying drawing which shows, for purposes of illustration only, one embodiment in accordance with the present invention, and wherein the single figure is a partial axial cross-sectional view through the rear axle drive provided with a brake in accordance with the present invention, the elements of the liquid circulatory system being illustrated only schematically in this figure.

Referring now to the drawing, a differential gear (not shown) of conventional construction is arranged within the housing 1 of the rear axle drive which differential includes a bevel gear 2 driven in a conventional manner by a pinion of the Cardan shaft. The toothed rim 3 of the bevel gear 2 is provided externally with teeth 4 which together with a pinion 5 constitutes a gear transmission producing an overdrive. The rear axle housing 1 is closed by a cover 6 which serves at the same time as housing for the hydrodynamic coupling generally designated by reference numeral 7 and serving as brake.

The hydrodynamic coupling 7 is so arranged that its axis 8 extends parallel to the axis of the differential. The hydrodynamic coupling 7 essentially consists of a pump wheel 9 which is driven from the bevel gear 2 by way of the shaft 10 and the gear drive 4, 5. The turbine wheel 11 of the hydrodynamic coupling 7 is constituted by the housing 6 itself. A partition wall 12 is disposed within the housing 6 by means of which the housing 6 is subdivided into an inner space 13 and into an outer space 14 whereby the latter is closed off against the outside by a cover 15. The cover 15 accommodates the bearings 16 for the shaft 10 and a hollow pipe connection 17 to be described more fully hereinafter, whereby the shaft 10 is suitably supported in any conventional manner on the opposite side within the housing 6.

A collecting dish or pan 18 is connected and secured at the pump wheel 9 which is matched in its shape to the form prescribed by the housing 6 and the partition wall 12. This collecting dish 18 rotates in unison with the pump wheel 9. Bores 19 connect the working space of the coupling 7 with the inner space 13. A circularly shaped curved scooping tube 20 extends from the space 13 through a bore 21 provided in the partition wall 12 into the outer space 14 where it is securely connected with a pivot lever 22. The pivot lever 22 may be pivoted in any conventional manner about an axis extending transversely to the coupling axis.

The shaft 10 is provided at the end opposite the gear drive 4, 5 with a bore 23 for the supply of the coupling liquid which bore 23 is in communication with the working space of the coupling 7 by way of cross bore 24. The pipe connection 17 extends sealingly into the mouth portion at the end of this hollow shaft 10. The pipe connection 17 is connected in turn with a three-way valve 25 which is adapted to be moved either selectively or automatically into a braking position I and into an operating position II. A pump 26 is arranged in the axle gear housing 1 in any suitable known manner, not illustrated in detail herein, and forces the oil out of this housing by way of a heat exchanger 27 and the three-way valve 25 into the supply line 17. The heat exchanger 27 is connected with the engine cooling system. A connection 28 for the return line is provided in the outer space 14 which leads by way of a check valve 29 into the axle gear housing 1 or the sump thereof.

Oil flows through the coupling 7 in the illustrated braking position. Depending on the position of the scooping tube 20, the coupling 7 is more or less full and thereby produces an easily and appropriately adjustable brake moment which is directly transmitted from the bevel gear of the differential to the axle gear housing 1. Upon shifting of the three-way valve 25 into the position II, the feed to the coupling 7 is blocked and the oil of the differential is cooled exclusively by the heat exchanger 27 and is fed back into the return line. A braking does not occur as the coupling 7 is emptied by way of the scooping tube itself into the oil sump.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A brake for motor vehicles, especially for heavy trucks with the aid of a hydrodynamic circulatory system, comprising:
    axle drive means including axle gear housing means and differential gear means having a bevel gear,
    and hydrodynamic coupling means including shaft means, coupling housing means, pump wheel means mounted on and operatively connected with said shaft means, and turbine wheel means,
    means for holding said turbine wheel means nonrotatable, said shaft means connected with said pump wheel means, and overdrive gear means for driving said pump wheel means by the direct operative engagement of said shaft means with said bevel gear, said over-drive gear means including pinion means mounted on said shaft means,
    and further means for selectively changing the degree of filling of said hydrodynamic coupling means,
    the hydrodynamic coupling means being arranged with the axis thereof parallel with the differential axis in said coupling housing means which is separate from the differential gear means, said coupling housing means constituting simultaneously the cover of the axle gear housing means,
    said bevel gear being provided externally with end teeth means meshing with the pinion means of said overdrive gear means on said shaft means.

2. A brake for motor vehicles, especially for heavy trucks, with the aid of a hydrodynamic circulatory system, comprising axle drive means including differential gear means having a bevel gear, and hydrodynamic coupling means including shaft means, housing means, pump wheel means mounted on and operatively connected with said shaft means, and turbine wheel means, means for holding said turbine wheel means nonrotatable, and overdrive gear means for driving said pump wheel means from said bevel gear, said turbine wheel means being secured at a fixed housing part of said housing means, and fixed partition wall means within the coupling housing means for sub-dividing said coupling housing means into an inner space, receiving the pump wheel means and the turbine wheel means constituted by the coupling housing means itself, and into an outer space, and cover means for closing said outer space, and rotating collecting dish means matched to the circumference of the coupling housing means and the fixed partition wall means thereof, the radial portion of said collecting dish means adjacent the partition wall means having such a large inner diameter and such a spacing from the back wall of the pump wheel means that a scooping tube can be inserted into the collecting dish means from the outer space.

3. A brake for motor vehicles, especially for heavy trucks, with the aid of a hydrodynamic circulatory system, comprising axle drive means including differential gear means having a bevel gear, and hydrodynamic coupling means including shaft means, housing means, pump wheel means mounted on and operatively connected with said shaft means, and turbine wheel means, means for holding said turbine wheel means nonrotatable, and overdrive gear means for driving said pump wheel means from said bevel gear, means for selectively changing the degree of filling of said hydrodynamic coupling including scoop tube means, said turbine wheel means being secured at a fixed housing part of said housing means, and fixed partition wall means within the coupling housing means for sub-dividing said coupling housing means into an inner space, receiving the pump wheel means and the turbine wheel means constituted by the coupling housing means itself, and into an outer space, and cover means for closing said outer space, and rotating collecting dish means matched to the circumference of the coupling housing means and the fixed partition wall means thereof, the radial portion of said collecting dish means adjacent the partition wall means having such a large inner diameter and such a spacing from the back wall of the pump wheel means that said scoop tube means can be inserted into the collecting dish means from the outer space, said scoop tube means being constructed as an approximately circular segmentally shaped tube introduced through an aperture in the partition wall means into the collecting dish means, and pivot lever means disposed in the outer space for pivoting said scoop tube means about an axis disposed transversely to the coupling axis, 4. A brake for motor vehicles, especially for heavy trucks, with the aid of a hydrodynamic circulatory system comprising axle drive means including differential gear means having a bevel gear, and hydrodynamic coupling means including shaft means, housing means, cover means for said housing means, pump wheel means mounted on and operatively connected with said shaft means, and turbine wheel means, means for holding said turbine wheel means nonrotatable, shaft means connected with said pump wheel means, and overdrive gear means for driving said pump wheel means by way of said shaft means from said bevel gear, bearing means for supporting said shaft means, said bearing means positioned at one end of said shaft adjacent said over-drive gear means and, at the other end of said shaft, within said cover means, said shaft means extending, in a sealing manner, between said bearing means, through said housing means, said turbine wheel means constituting one end of said housing means, the said coupling shaft means being of hollow construction from turbine wheel means to the end opposite for the purpose of the coupling liquid supply and being provided at said end with a mouth portion, and pipe connecting means sealingly engaging with said mouth portion and being centrally arranged within said cover means.

5. A brake for motor vehicles, especially for heavy trucks with the aid of a hydrodynamic circulatory system, comprising axle drive means including differential gear means having a bevel gear, and hydrodynamic coupling means including shaft means, housing means, cover means for said housing means, pump wheel means mounted on and operatively connected with said shaft means, and turbine wheel means, means for holding said turbine wheel means nonrotatable, shaft means connected with said pump wheel means, and overdrive gear means for driving said pump wheel means by way of said shaft means from said bevel gear, fixed partition wall means within the coupling housing means for subdividing said housing means into an inner space receiving the pump wheel means and the turbine wheel means constituted by the housing means itself and into an outer space, said cover means closing said outer space, bearing means for supporting said coupling shaft means, said bearing means positioned at one end of said shaft adjacent said over-drive gear means and, at the other end of said shaft, within said cover means, said shaft means extending, in a sealing manner, between said bearing means, through said housing means, said turbine wheel means constituting one end of said housing means, said shaft means being of hollow construction from the turbine wheel means to the end opposite for the purpose of the coupling liquid supply and being provided at said end with a mouth portion, and pipe connecting means sealingly engaging with said mouth portion and being centrally arranged within said cover means, and discharge means including a pipe connection terminating in the outer space closed off by said cover means.

6. A brake for motor vehicles, especially for heavy trucks with the aid of a hydrodynamic circulatory system, comprising axle drive means including differential gear means having a bevel gear, and hydrodynamic coupling means including shaft means, pump wheel means mounted on and operatively connected with said shaft means, and turbine wheel means, means for holding said turbine wheel means nonrotatable, and overdrive gear means for driving said pump wheel means by way of said shaft means from said bevel gear, and a circulatory system for the coupling liquid including pump means, heat exchanger means, and closure means, the oil of the differential gear means serving as a coupling liquid.

7. A brake for motor vehicles having an engine cooling circulatory system, especially for heavy trucks with the aid of a hydrodynamic circulatory system, comprising axle drive means including differential gear means having a bevel gear, and hydrodynamic coupling means including shaft means, pump wheel means mounted on and operatively connected with said shaft means, and turbine wheel means, means for holding said turbine wheel means nonrotatable, and overdrive gear means for driving said pump wheel means by way of said shaft means from said bevel gear, and a circulatory system for the coupling liquid including pump means, heat exchanger means, and closure means, the oil of the differential gear means serving as coupling liquid, the cooling liquid of the engine cooling circulatory system flowing through said heat exchanger means, said heat exchanger means being disposed between said pump means and said closure means, and said closure means being constructed as three-way valve operable to selectively conduct the liquid flow coming from said pump means either to the discharge or to the hydrodynamic coupling means serving as brake.

8. A brake for motor vehicles, having an engine cooling circulatory system, especially for heavy trucks with the aid of a hydrodynamic circulatory system, comprising axle drive means including differential gear means having a bevel gear, and hydrodynamic coupling means including shaft means, pump wheel means mounted on and operatively connected with said shaft means, and turbine wheel means, means for holding said turbine wheel means nonrotatable, and overdrive gear means for driving said pump wheel means by way of said shaft means from said bevel gear, and a circulatory system for the coupling liquid including a feed line, a return line, pump means, heat exchanger means, and closure means, the oil of the differential gear means serving as coupling liquid, the cooling liquid of the engine cooling circulatory system flowing through said heat exchanger means, said heat exchanger means being disposed between said pump means and said closure means, and said closure means being constructed as three-way valve operable to selectively conduct the liquid flow coming from said pump means either to the discharge or to the hydrodynamic coupling means serving as brake, and check valve means within the return line from the hydrodynamic coupling means serving as brake.

9. A brake for motor vehicles, especially for heavy trucks with the aid of a hydrodynamic circulatory system, comprising:

axle drive means including axle gear housing means and differential gear means having a bevel gear, and hydrodynamic coupling means including shaft means, coupling housing means, pump wheel means mounted on and operatively connected with said shaft means, and turbine wheel means, means for holding said turbine wheel means nonrotatable, said shaft means connected with said pump wheel means, and overdrive gear means for driving said pump wheel means by the direct operative engagement of said shaft means with said bevel gear, said overdrive gear means including pinion means mounted on said shaft means, and further means for selectively changing the degree of filling of said hydrodynamic coupling means, the hydrodynamic coupling means being arranged with the axis thereof parallel with the differential axis in said coupling housing means which is separate from the differential gear means, said coupling housing means constituting simultaneously the cover of the axle gear housing means.

References Cited

UNITED STATES PATENTS

| | | | |
|---|---|---|---|
| 1,694,020 | 12/1928 | Price | 188—86 |
| 1,858,514 | 5/1932 | Lell. | |
| 1,859,607 | 5/1932 | Sinclair. | |
| 1,881,083 | 10/1932 | Kiep. | |
| 1,915,547 | 6/1933 | North et al. | 188—90 |
| 2,388,704 | 11/1945 | Potter | 188—90 |
| 2,889,013 | 6/1959 | Schneider | 188—90 |

FOREIGN PATENTS

| | | |
|---|---|---|
| 803,377 | 4/1951 | Germany. |

BENJAMIN W. WYCHE, III, *Primary Examiner.*